May 11, 1965     J. G. ZIMMERMAN ETAL     3,182,830
CONTROL FOR BOOM LOCKING APPARATUS

Filed July 26, 1962     2 Sheets-Sheet 1

INVENTORS
JOHN G. ZIMMERMAN
RICHARD D. CLARK
BY
ATTORNEY

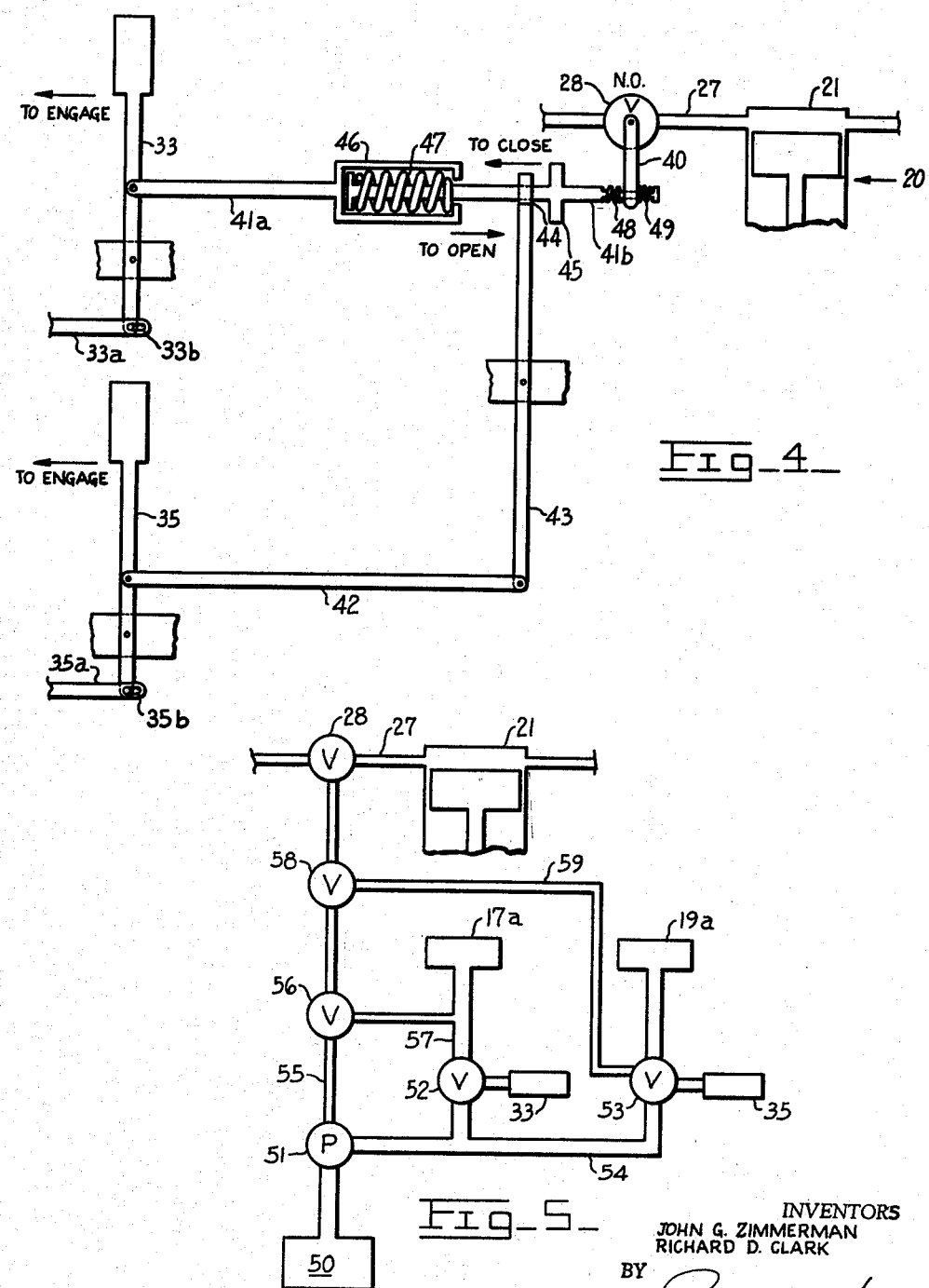

United States Patent Office 3,182,830
Patented May 11, 196

3,182,830
CONTROL FOR BOOM LOCKING APPARATUS
John G. Zimmerman, Evansville, Ind., and Richard D. Clark, Oak Creek, Wis., assignors to Bucyrus-Erie Company, South Milwaukee, Wis., a corporation of Delaware
Filed July 26, 1962, Ser. No. 212,606
7 Claims. (Cl. 214—138)

This invention relates to a control for boom locking apparatus for maintaining the position of the boom of a back hoe excavator with respect to the supporting frame.

To prevent the boom of a back hoe from raising due to upward reaction of the ground on the digging implement during the digging cycle, it is a practice to provide a device to lock the boom in relation to its supporting structure. An example of a boom locking apparatus is disclosed in U.S. Patent No. 2,873,871 to J. P. Waite; the boom locking apparatus can also be a variable-length strut, such as a single-acting hydraulic cylinder, connected betwene the boom and the boom supporting structure which can be locked at any selected length. With such boom locking apparatus, a manually operable control is normally provided to set or lock the apparatus in any position and thereby prevent the boom from raising above a preselected height. Such a control, however, operating independently of digging and hoisting controls, limits its utility in a back hoe excavator.

Boom locking apparatus could have a normally-engaged control to insure that the boom lock is operative at all times during digging operations, and could be over ridden by the boom hoist control to permit raising the boom during the dumping cycle. Such a control for a boom locking apparatus, however, would limit the versatility of a back hoe excavator during the digging cycle, because there are occasions when it is desirable to release the boom lock without raising the boom in order to permit the digging depth of the back hoe to be determined by a balance between the combined weight of the boom, dipper stick, and digging implement in relation to the upward reaction of the ground. In this condition, the digging implement is said to "float" during digging operations. With a normally-engaged boom lock, this type of digging operation is impossible.

Accordingly, it is an object of the present invention to provide a control for a boom lock apparatus of a back hoe, which includes an interlock between the digging and the hoisting controls, that insures automatic locking of the boom during a predetermined portion of the digging cycle, and also permits, at any time, a manual override of the boom lock at the will of the operator, as well as automatic release of the boom locking apparatus whenever the boom is raised by the boom hoist.

It is also an object of the invention to provide a control for the boom lock apparatus of a back hoe which will permit normal operation of the back hoe in the event of failure of the control linkage.

The invention consists in the novel parts and in the combination and arrangements thereof, which are defined in the appended claims, and of which three different embodiments are exemplified in the accompanying drawings which are hereinafter particularly described and explained.

FIGURE 4 is a diagrammatic view of a mechanic linkage arranged to control the boom locking apparatu of FIGURE 1 and constituting a second embodiment ( the present invention;

FIGURE 5 is a schematic diagram of an hydraulic cor trol circuit for the boom locking apparatus of FIGURE and constituting a third embodiment of the present invertion.

Figure 1:
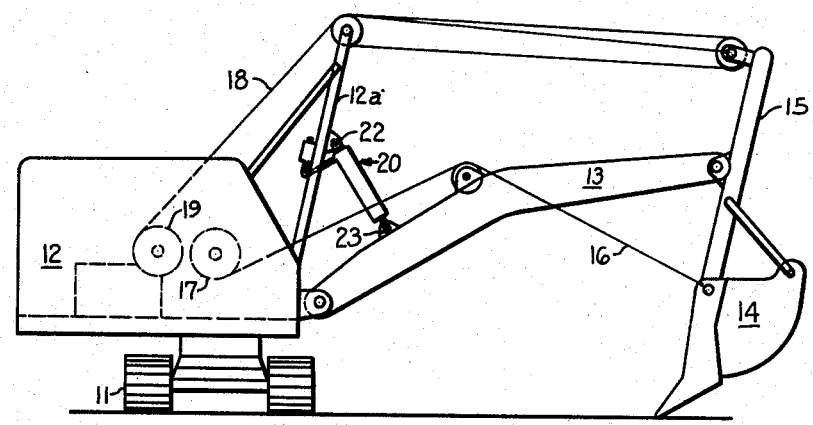
FIGURE 1 is a diagrammatic side elevation of a back hoe excavator provided with a boom locking apparatus.

Referring to FIGURE 1, a power operated back hoe illustrated having ground engaging supports 11 in tr form of crawler traction belts upon which is mounted rotatable frame 12 which comprises the upper work The upper works includes a source of power for the sel propelling mechanism and the drive mechanism for tr digging and the hoisting functions of the back hoe.

A forwardly extending boom 13 is pivotally connecte to the frame and supports a digging implement, such dipper 14, for movement toward and away from tr frame by means of dipper stick 15 pivoted adjacent tr outer end of the boom. A drag, or digging, cable 1 wound upon winch drum 17 and reeved over sheave 1: on the boom pulls dipper 14 toward the frame durir the digging cycle. Raising and lowering of the boom du ing digging and dumping cycles is effected by means ( cable 18 wound upon winch drum 19 and connected t reeving 18a to the opposite end of dipper stick 15. Boi drums 17 and 19 are powered for rotation by driv mechanism (not shown) and controlled by separate di ging and hoisting clutches, or other means, to engage ar disengage the flow of power to their respective drums.

To prevent the boom 13 from raising due to the upwai reaction of the ground on the digging implement durir the digging cycle, a boom locking apparatus 20 is pivota ly interconnected between the boom 13 and supportir frame 12a fixed on frame 12. The boom locking appar tus is preferably in the form of a variable length str which may be engaged or locked in any selected positic to prevent the boom from pivoting upwardly. In th manner, the weight of the frame 12 and the ground e: gaging supports 11 is brought to bear on the digging ir plement to increase the force which may be effective applied to dipper 14 during the digging cycle.

It is desirable to control the boom locking apparatus to lock during a predetermined portion of the diggir cycle, namely whenever the digging clutch, or other co trol means for drum 17, is engaged to retrieve cable ] and pull the dipper toward the frame. It is also desi able that the boom locking apparatus be capable of beir released at any time at the will of the operator. Su( control will permit maximum utility of the back hoe du ing certain digging operations when the penetrating for of the dipper is to be determined by a balance of tl weight of the boom, dipper stick, and dipper in relation the upward reaction of the ground. During such oper tion, the dipper is allowed to "float" during the diggir cycle, being neither raised by the hoist cable nor prever ed from raising by the boom locking apparatus.

In a control for a boom locking apparatus, it is also d sirable that a positive override be provided to operate any time when the control means for hoisting drum 19 engaged to raise the boom. It is also desirable to have control circuit or linkage which will permit normal oper tion of the back hoe and disengage the boom lock appar tus in the event of failure of any portion of the contr means for the boom lock.

The boom lock apparatus 20 is shown in detail in FI( URE 2 as a variable length strut, which is operable either a single-acting or double-acting hydraulic cylind 21. The boom lock apparatus 20 is pivotally interco nected at 22 to the supporting frame 12a and at 23 the boom 13. Cylinder 21 is adapted to receive for reci ation therein a piston 24 having a projecting rod 25. [W]orking fluid is supplied from reservoir 26 through con[dui]ts 27 and 27a and normally-open valve 28 to the lock[ing] end of the cylinder. When the boom locking appara[tus] 20 is operated as a double-acting cylinder, the rod of the cylinder may also be used as the fluid reservoir, a portion thereof, to supply the working fluid to the [di]gging end of the cylinder by means of conduit 27b. By [us]ing valve 27c having a discharge port 27d, the boom [lock] apparatus operates as a single-acting cylinder. [D]uring the lowering of the boom 13 at any time when [nor]mally-open valve 28 is closed, fluid is supplied to the [di]gging end of cylinder 21 through conduit 27c and check [valv]e 29. As the boom is raised by means of either the [hois]ting drum 19 and cable 18 or the upward reaction of [the] ground during digging, the fluid in the locking end of [the] cylinder is returned to the reservoir through the nor[mal]ly-open control valve 28. If it is desired to prevent [the] boom from raising during digging operations, the [boo]m lock is engaged by closing valve 28 which limits the [com]pressed length of the boom lock but permits an in[crea]se in its length as the boom is lowered by means of [flui]d flowing through the check valve 29 as the piston [mo]ves away from the locking end of the cylinder.

[T]urning now to the first embodiment of the invention, [t]he electrical form of the boom lock control shown in [FIG]URE 3, normally-open valve 28 is actuated to close [by] means of a solenoid 30 thereby engaging boom lock [20]. The solenoid is operated by means of a control circuit [fro]m a source of electrical energy, such as battery 31, [thro]ugh a normally-open switch 32, which is preferably [in t]he form of an adjustable micro-switch, and is actuated [to c]lose by initial movement of the lever 33 of winch [dru]m 17. The digging-control actuated micro-switch 32 [is i]n series relationship to a second switch 34 which is [pref]erably in the form of a normally-closed micro-switch [and] actuated to open by a control means, such as lever 35, [of] drum 19. The control circuit then leads from the [seco]nd micro-switch 34 to solenoid 30.

[D]uring operation of the back hoe, boom lock apparatus will not be engaged until micro-switch 32 is closed by movement of winch drum lever 33. This permits rais[ing] of the boom by hoist cable 18. During the digging [cyc]le, initial movement of lever 33 as the operator starts [to e]ngage the winch drum 17 to pay in cable 16 will cause [swi]tch 32 to close thereby energizing solenoid 30 to close [valv]e 28. The flow of fluid is blocked by the closed valve from the locking end of cylinder 24 to prevent the [boo]m from raising and thereby resists the upward reaction [of t]he ground on the boom during the digging cycle. How[eve]r, in the event the operator desires to raise the boom [or] permit it to "float" at any time during the digging [cyc]le, normally-closed micro-switch 34 can be opened by initial actuation of hoisting control lever 35 to open [valv]e 28 by de-energizing solenoid 30 to unlock boom [lock] apparatus 20. As soon as the hoisting control lever [35] is returned to its disengaged position, as shown in FIG[UR]E 3, normally-closed switch 34 will re-establish the [con]trol circuit of solenoid 30 to engage the boom lock. [Hoi]st control lever 35, as well as digging control lever 33, [whic]h allow for an initial movement of the control lever [to a]ctuate the associated switch prior to establishing the [flow] of power to the respective cable winding drum. In [this] manner, the boom lock apparatus 20 can be disen[gag]ed at the will of the operator at any time during the [dig]ging cycle without the necessity of maximum move[men]t of the hoist control means which would thereby en[gag]e drum 19 to raise the boom. This permits maximum [flex]ibility and utility of the back hoe during the digging [cyc]le as well as insuring the disengagement of the boom [lock] prior to engagement of the hoist drum clutch when [the] boom is to be raised during the digging cycle.

[I]n the event that the boom-lock control circuit is broken [at a]ny point, a "fail-safe" condition is assured which will [per]mit normal operation of the back hoe without the pos-sibility of damage to any components in event of unexpected engagement of the boom lock during hoisting of the boom or in the event of failure of the boom lock to disengage prior to engagement of hoist drum 19.

Figure 2:
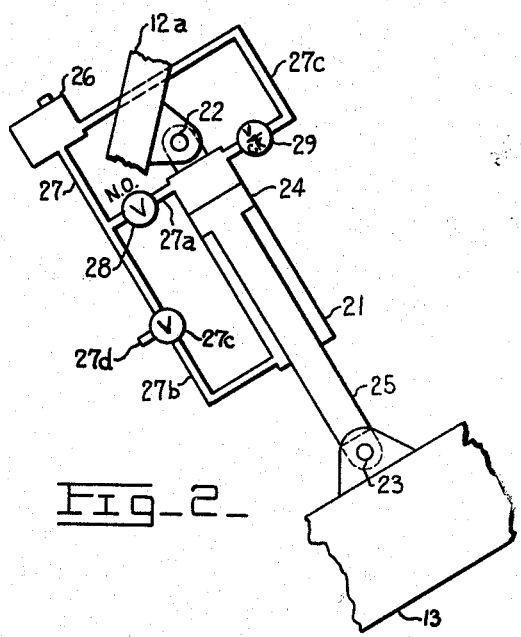
FIGURE 2 is an enlarged schematic view of the boom locking apparatus of FIGURE 1 in the form of an hydraulic cylinder showing the hydraulic system and valves for engaging the boom lock.
Figure 3:
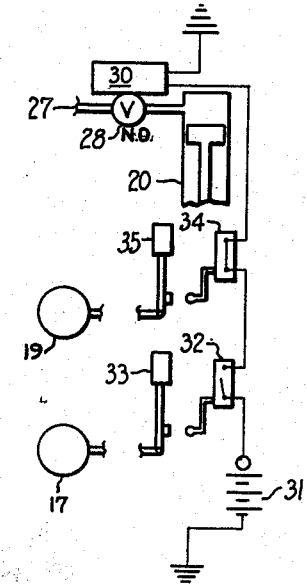
FIGURE 3 is a schematic diagram of an electrical circuit embodying the invention and adapted to control the boom locking apparatus of FIGURE 1.

Turning now to the second embodiment of the invention, FIGURE 4 discloses a mechanical control to effect engagement of the boom lock during the digging cycle and disengagement during the raising of the boom, as well as permitting disengagement of the boom lock at any time at the will of the operator. Valve 28 and a portion of cylinder 21 and line 27 of FIGURE 2 is shown in FIGURE 4 associated with the mechanical control; movement of valve 28 from its normally-open position to a closed postion will effect engagement of the boom lock device, the operation of which is the same as described above.

The mechanical control for the boom lock apparatus 20 comprises an actuating arm 40 shown in its normal position with valve 28 open. Arm 40 connected to connecting rod 41b, is positioned in a clockwise direction by the initial movement of lever 33 interconnected to rod 41b by rod 41a. Such clockwise positioninng of arm 40 closes valve 28 to lock boom lock apparatus 20. As lever 33 is moved through the initial positioning, allowed by lost-motion means 33b, rod 33a is positioned by continued movement of lever 33 to establish a flow of power to digging drum 17. Upon return of lever 33 to its normal position, as shown, rods 41a and 41b, comprising an interlock linkage, will return valve 28 to its normally-open position thereby unlocking boom lock apparatus 20.

If it is desired to release the boom lock during the digging cycle, initial movement of hoist control lever 35 to the left will return valve 28 to its normally-open position by means of an interlock comprised of connecting rod 42 and cross-over lever 43. Lever 43 is provided with a bifurcated end 44 which contacts collar 45 fixed to connecting rod 41b. Movement of rod 41b independently of rod 41a is permitted by lost-motion link 46 and spring 47 contained therein. Biasing springs 48 and 49 are provided on both sides of arm 40 to accommodate minor differences in the magnitude of movement of the various linkage components. During normal raising of the boom, movement of hoist control lever 35 to the left allowed by lost-motion means 35b will open valve 28 to disengage the boom lock apparatus 20 prior to hoist clutch control rod 35a establishing the flow of power to cable drum 19.

Turning now to the third embodiment of the invention, FIGURE 5 discloses a fluid pressure control circuit for valve 28 to effect engagement and disengagement of the boom lock device, a portion of which is shown as the locking end of cylinder 21. A reservoir 50 of fluid connected to pump 51 supplies fluid under pressure to a digging control valve 52 and a hoist control valve 53 by means of branched conduit 54. Actuation of digging control lever 33 and hoist control lever 35 will open their associated valves 52 and 53 to admit fluid under pressure to the respective clutch actuating cylinders 17a and 19a of cable winding drums 17 and 19 to provide selective establishment of a power train to these cable drums.

Normally-open valve 28 is preferably a conventional pilot-operated valve which receives fluid under pressure through pilot supply line 55. The pilot supply line is blocked by a normally-closed pilot-operated valve 56 which is remotely controlled by the digging control valve 52; opening control valve 52 by means of actuation of lever 33 will admit fluid through line 57 to clutch actuator 17a as well as to a conventional pilot piston in valve 56 thereby opening pilot supply line 55. Pilot fluid under pressure then flows through the remainder of pilot supply line 55 through a normally-open pilot valve 58 to the pilot piston of valve 28 to cause valve 28 to move to a closed position and effect engagement of the boom-lock device. Movement of digging control lever 33 to its disengaged position (as shown in FIGURE 4) will again close valve 52; pressure fluid in the actuating cylinder 17a and the associated supply line 57 may be either vented overboard or returned to the reservoir by return lines. This will permit valve 56 to return to its normally-closed position; fluid under pressure downstream of valve 56 may also be vented overboard or returned to the reservoir to permit pilot-operated valve 28 to return to its normally-open position thereby releasing the boom lock device.

If it is desired to disengage the boom lock during the digging cycle, initial movement of hoist control lever 35 will open valve 53 to admit fluid under pressure through line 59 to pilot-operated valve 58 thereby blocking pilot supply line 55 at their point; fluid under pressure between valve 58 and the pilot piston of valve 28 may be either vented overboard or returned to reservoir 50 in a conventional manner by means not shown. This will permit valve 28 to return to its normally-open position and effect release of boom lock 20 at any time during the digging cycle.

During normal raising of the boom, movement of hoist control lever 35 to its fully engaged position will, in sequence, first admit pressure fluid to pilot-operated valve 58 and later to clutch actuating cylinder 19a of the hoist drum, thereby releasing the boom lock prior to establishing the flow of power to the cable drum 19. Thus disengagement of the boom-lock device is insured during raising of the boom, regardless of the position of digging control lever 33. Such a construction also permits the operator to control the boom lock at any time during the digging cycle, which results in maximum flexibility and utility of the back hoe.

Having now described and illustrated three forms of the invention, it is to be understood that this invention is not to be limited to the specific form or arrangement of parts herein shown and described or specifically covered by the claims.

What is claimed is:

1. For an excavating machine having a machinery platform; a pivoted boom extending out from said platform; a dipper stick pivoted at the outer end of the boom; a back-acting dipper on said dipper stick; a hoist drum on said machinery platform with a hoist cable extending to said dipper stick; a hoist control lever associated with said hoist drum; a digging drum with a digging cable extending to said dipper; and a digging control lever associated with said digging drum, the combination of:
    a boom lock of variable length having a hydraulic cylinder and piston with one end fixed and the other end attached to said boom;
    a normally open valve;
    a fluid reservoir connected through said normally open valve to said cylinder;
    means for closing said valve;
    a first control element operated by said digging control lever during initial movement of the lever for operating said means to close said valve; and
    a second control element operated by said hoist control lever during initial movement of the lever for opening said means to open said valve regardless of operation of said first control element.

2. For an excavating machine having a frame, a boom pivotally supported on said frame, a dipper support from said boom, hoisting means with a hoist control lever for raising said boom, and digging means with a digging control lever for working the dipper, the combination of:
    a hydraulic boom lock of variable length having cylinder and reciprocable piston rod extending therefrom, with one end of the boom lock fixed and the other end connected to said boom;
    a valve leading to said cylinder closeable to confine fluid within said cylinder;
    a first control element operated by said digging control lever to operate said valve to closed position; and
    a second control element operated by said hoist control lever and cooperatively joined with said first control element, which disables the operation of said first control element, thereby restoring said valve open condition regardless of operation of said first control element;
    said valve being in open position when neither of said control elements are operated.

3. An apparatus as in claim 2, wherein initial movement of said hoist control lever operates said second control element in advance of a hoisting operation.

4. An apparatus as in claim 3, wherein initial movement of said digging control lever operates said first control element in advance of a digging operation.

5. An apparatus as in claim 2, having a solenoid operating said valve; said first control element is a switch, said second control element is a switch; and said switches are connected serially with said solenoid.

6. An apparatus as in claim 2, wherein said valve mechanically operated; said first control element is linkage joined with said valve and includes a lost motion section; and said second control element is a linkage joined with said valve adapted to open the valve regardless of position of said first control element.

7. An apparatus as in claim 2, wherein said valve fluid operated; said first control element comprises first valve means; said second control element comprises second valve means; and said valve means are connected serially with said valve.

References Cited by the Examiner
UNITED STATES PATENTS 3,073,465 1/63 Strnad _____ 214—1
3,117,686 1/64 Brown _____ 214—1

GERALD M. FORLENZA, Acting Primary Examiner
HUGO O. SCHULZ, Examiner.